United States Patent [19]

Silversides

[11] Patent Number: 5,641,012
[45] Date of Patent: Jun. 24, 1997

[54] VALVE DEVICE

[75] Inventor: John Silversides, Cottingham, United Kingdom

[73] Assignee: Horstine Farmery Limited, United Kingdom

[21] Appl. No.: 434,932

[22] Filed: May 4, 1995

[30] Foreign Application Priority Data

May 7, 1994 [GB] United Kingdom ............... 9409101
Mar. 7, 1995 [GB] United Kingdom ............... 9504543

[51] Int. Cl.⁶ ................................ B65B 1/04; B65B 3/04
[52] U.S. Cl. ...................... 141/383; 141/384; 141/346; 141/372; 137/846; 251/215
[58] Field of Search ............................... 141/383, 384, 141/386, 346–354, 369, 370, 372, 379–381; 222/519, 520, 494, 491; 137/846, 614.06; 251/215, 251, 149.8, 149.9

[56] References Cited

U.S. PATENT DOCUMENTS

| | | |
|---|---|---|
| 1,226,722 | 5/1917 | Sullivan . |
| 1,257,910 | 2/1918 | Meves . |
| 1,934,197 | 11/1933 | MacKay et al. . |
| 2,128,488 | 8/1938 | Koerner . |
| 2,165,825 | 7/1939 | Bultzingslowen ................... 222/519 |
| 2,182,878 | 12/1939 | Pipenhagen . |
| 2,210,206 | 8/1940 | Fisher . |
| 2,254,997 | 9/1941 | Fisher . |
| 2,300,546 | 11/1942 | Griest ................................. 221/114 |
| 2,413,571 | 12/1946 | Krone et al. . |
| 2,598,002 | 5/1952 | Langdon ............................. 137/846 |
| 2,665,926 | 1/1954 | Fraser . |
| 2,905,486 | 9/1959 | Goodin, Jr. et al. . |
| 2,975,465 | 3/1961 | Lerner et al. . |
| 3,055,405 | 9/1962 | Pase . |
| 3,123,107 | 3/1964 | Kappler . |
| 3,187,965 | 6/1965 | Bourget . |
| 3,224,728 | 12/1965 | Buseth et al. . |
| 3,232,498 | 2/1966 | Bennett ............................... 222/449 |
| 3,296,649 | 1/1967 | Schwartzman . |
| 3,446,403 | 5/1969 | Serio . |
| 3,473,569 | 10/1969 | Guertin et al. ..................... 137/614 |
| 3,543,814 | 12/1970 | Aluotto . |
| 3,574,314 | 4/1971 | Quercia . |
| 3,625,251 | 12/1971 | Nelson . |

(List continued on next page.)

FOREIGN PATENT DOCUMENTS

| | | |
|---|---|---|
| 0 341 115 | 11/1989 | European Pat. Off. . |
| 0 389 919 | 10/1990 | European Pat. Off. . |
| 0 498 473 | 8/1992 | European Pat. Off. . |
| 0 498 474 | 8/1992 | European Pat. Off. . |
| 858617 | 7/1949 | Germany . |
| 337373 | 5/1959 | Germany . |
| 31 25 646 | 2/1983 | Germany . |
| 41 12 885 | 10/1992 | Germany . |
| 59-47568 | 3/1984 | Japan . |
| 6-58431 | 3/1994 | Japan . |
| 505681 | 6/1939 | United Kingdom . |
| 2 020 398 | 11/1979 | United Kingdom . |

Primary Examiner—Renee S. Luebke
Assistant Examiner—Steven O. Douglas
Attorney, Agent, or Firm—Scully, Scott, Murphy & Presser

[57] ABSTRACT

A value device for connecting a container filled with a flowable material to an applicator device for dispensing the flowable material comprises a unitary, essentially cup-shaped housing 1 having an axially extending flow passage 9 in the base thereof. A valve seat 50 is formed around the inner end of the flow passage 9, radially inwardly of the axially extending wall 8 of the housing 1. A unitary, essentially cylindrical valve member 2 is received in the open end of the cup-shaped housing 1. This has an axially extending flow passage 16 therein in axial alignment with the flow passage 9 in the up-shaped housing 2. A valve disc 14 is positioned over the inner end of the flow passage 16, but spaced therefrom. The valve member 2 is axially displaceable relative to the housing 1 upon rotational movement of the housing 1 so as to effect engagement of the valve disc 14 with the valve seat 50 to close the flow passage 9 in the housing 1 and disengagement to open the flow passage 9 in the housing 1. In use, the housing 1 is connected to the discharge orifice of the container and the valve member 2 is connected to the receiving orifice of the applicator.

10 Claims, 6 Drawing Sheets

U.S. PATENT DOCUMENTS

| | | | |
|---|---|---|---|
| 3,971,493 | 7/1976 | Williams . | |
| 4,026,336 | 5/1977 | Spies . | |
| 4,164,307 | 8/1979 | Imamura et al. . | |
| 4,186,783 | 2/1980 | Brandt . | |
| 4,244,522 | 1/1981 | Hartwig . | |
| 4,356,848 | 11/1982 | Spies | 141/349 |
| 4,421,146 | 12/1983 | Bond et al. . | |
| 4,489,858 | 12/1984 | Pritchitt | 222/182 |
| 4,509,554 | 4/1985 | Failla . | |
| 4,582,229 | 4/1986 | Wolf . | |
| 4,892,117 | 1/1990 | Spalink et al. . | |
| 4,936,345 | 6/1990 | Nix . | |
| 4,947,986 | 8/1990 | Ballu | 206/221 |
| 4,979,655 | 12/1990 | Gallucci | 222/519 |
| 5,029,624 | 7/1991 | McCunn et al. | 141/346 |
| 5,060,701 | 10/1991 | McCunn et al. | 141/346 |
| 5,111,977 | 5/1992 | Maguire et al. | 222/519 |
| 5,125,438 | 6/1992 | McCunn et al. | 141/346 |
| 5,224,527 | 7/1993 | McCunn et al. | 141/346 |
| 5,263,521 | 11/1993 | Brossard et al. | 141/384 |
| 5,379,812 | 1/1995 | McCunn et al. | 141/346 |

VALVE DEVICE

BACKGROUND OF THE INVENTION

1. Field of the Invention

The present invention relates to a valve device for coupling a container filled with a flowable material, such as fertiliser, pesticide or the like, to an applicator device for dispensing the said material, and for controlling the flow of material from the container into the applicator device.

When sowing seeds in a field it is often a requirement to apply an agricultural treatment agent, such as a fertiliser or pesticide, along with the seeds. Typically, the seeds and the material to be applied along with them are held in separate hoppers carried by a planting/applicator device and each is dispensed from its respective hopper by a metering device. The fertiliser or pesticide may also be applied on its own, typically from a broadcaster device.

Increasingly, it is considered desirable for agricultural workers to avoid direct contact with certain agricultural treatment agents. These agricultural treatment agents are usually stored ready for use in sealed containers which must be opened and emptied into the relevant hopper on the planter/applicator device. Inevitably, such a procedure involves at least some exposure to the agricultural treatment agent.

2. Discussion of the Prior Art

U.S. Pat. No. 5,029,624 discloses a valve system for controlling the flow of a flowable agricultural treatment agent from a container for the material to a receiving chamber or hopper. The container has a material dispensing valve and the chamber or hopper has a material receiving valve. The dispensing valve and the receiving valve are adapted to be coupled and uncoupled so that on being coupled both valves are opened to allow material to flow from the container to the hopper and on being uncoupled both valves are biased to a closed position.

The valve system is so designed that material will not flow from the container into the hopper until the container is properly mounted on the hopper. Furthermore, the dispensing valve inter-acts with the receiving valve in such a way as to introduce a time delay between the opening and closing of the valves to assure a free flow of material and prevent any leakage of material before the container is removed from the hopper.

The valve system of U.S. Pat. No. 5,029,624 is very effective at preventing the escape of an agricultural treatment agent, both as it is emptied from a container into a hopper and after. However, it is very complex in design, requiring as it does a dispensing valve for the container and a receiving valve for the hopper, and as a consequence it is relatively expensive. The system is made even more expensive by providing each container with its own dispensing valve as envisaged in the aforementioned prior art document.

SUMMARY OF THE INVENTION

It is an object of the present invention to provide a relatively simple valve device for coupling a container filled with a flowable agricultural treatment agent to an applicator device for dispensing the said material which valve device allows the container to be removed from the applicator device whilst still partially filled with material without any material escaping.

According to the present invention there is provided a valve device for connecting a container filled with a flowable material to an applicator device for dispensing the flowable material, comprising a unitary, essentially cup-shaped housing having an axially extending flow passage in the base thereof and a valve seat formed around the inner end of the flow passage and radially inwardly of the axially extending wall of the housing, a unitary, essentially cylindrical valve member which is received in the open end of the said cup-shaped housing, having an axially extending flow passage therein in axial alignment with the flow passage in the cup-shaped housing and a valve disc which is positioned over the inner end of the flow passage, but spaced therefrom, means for axially displacing the valve member relative to the housing upon rotational movement of the housing so as to effect engagement of the valve disc with the valve seat to close the flow passage in the housing and disengagement to open the flow passage in the housing, and means for connecting the housing to the discharge orifice of the container and for connecting the valve member to the receiving orifice of the applicator.

The means for effecting axial displacement of the valve member relative to housing may comprise radially outwardly projecting lugs carried by the valve body which engage in camming grooves in the axially extending wall of the housing or alternatively radially inwardly projecting lugs carried by the axially extending wall of the housing which engage in camming grooves in the valve body. Either way by rotating the housing relative to the valve member the lugs are forced to track from one end of the camming grooves to the other and this has the effect of axially displacing the valve member into or out of the housing which causes the valve disc to engage or disengage with the valve seat, depending on the direction of rotation.

Preferably, a circumferentially continuous groove is provided in the base of the housing around the flow passage and the valve seat defined therein and an upstanding circumferentially continuous flange is provided around the inner end of the valve member, which upstanding flange is received in the continuous groove when the valve device is closed. This serves to prevent material leaking out of the valve device through the gap between the wall of the housing and the valve member.

In use the valve device is mounted in the discharge spout of a container and is closed to prevent any leakage of material. This may be done after the container has been filled with material as an integral part of the production process in which case each container will be provided with a valve device. However, as a more economical alternative the valve device is fitted to a container immediately prior to use and can be removed after use or when the container has been emptied. To prevent any leakage of material from the container prior to use it may be fitted with a removable cap and/or a seal which is broken when the valve device is fitted.

When coupling the container to the applicator, the container is inverted and the valve device is positioned in or over the receiving opening of the hopper. Conveniently, this is achieved using a bayonet fitting i.e. the receiving opening in the applicator is provided with prongs which engage in slots in the valve member. The housing is then rotated relative to the valve member to cause axial displacement of the one relative to the other. This disengages the valve disc from the flow passage in the base of the housing which allows material to flow from the container into the applicator.

When uncoupling the container from the applicator this process is reversed. The housing is rotated relative to the valve member in the opposite direction to bring the valve disc into engagement with the valve seat and thereby close off the flow passage. The valve device and the container are then uncoupled from the applicator.

Usually the applicator will comprise a hopper and the valve device is connected to the receiving orifice in the lid of the hopper. However, it is envisaged that in some applications the hopper may be dispensed with and the container will remain attached to the applicator throughout the period of use.

To prevent material escaping from the receiving opening in the applicator this can be closed with a cap or lid. Alternatively, the receiving opening may be provided with a self sealing device which opens during the flow of material from the container to the applicator (when the valve device of the present invention is fitted to it) and closes when material ceases to flow from the container to the applicator. This latter arrangement ensures that there is no leakage of material from the receiving opening in the applicator.

Conveniently the self sealing device comprises a resilient diaphragm or tube fitted across the receiving orifice of the applicator and having an opening therein which is normally closed. When the valve device is opened to allow material to flow from the container into the applicator, the weight of material on the resilient tube or diaphragm forces open the normally closed opening therein. When the flow of material ceases, the resilient diaphragm or tube resumes its normally closed condition, thereby substantially preventing material in the applicator from escaping through the receiving opening when the valve device is removed.

The valve device of the present invention enables material to be emptied from a container into an applicator without any risk of leakage, yet is of simple design compared with the acknowledged prior art valve system.

BRIEF DESCRIPTION OF THE DRAWINGS

An embodiment of the present invention will now be described, by way of example, with reference to the accompanying drawings, in which.

DETAILED DESCRIPTION OF PREFERRED EMBODIMENTS

Figure 3:
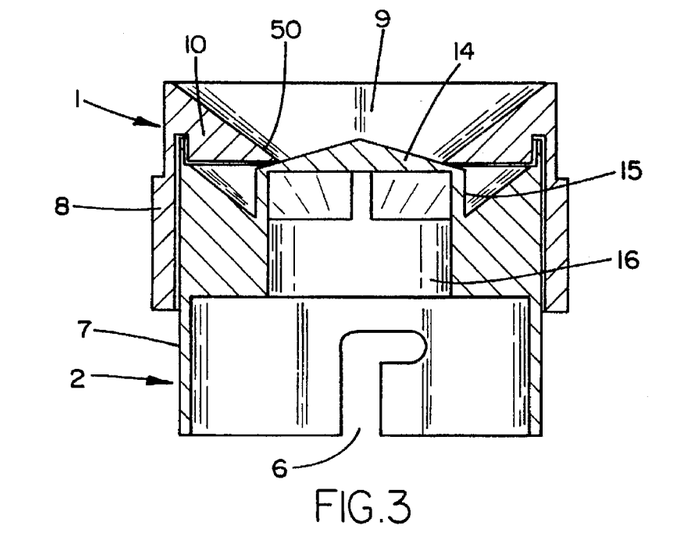
FIG. 3 shows a sectional view of the valve device of FIG. 1 when closed.
Figure 4:
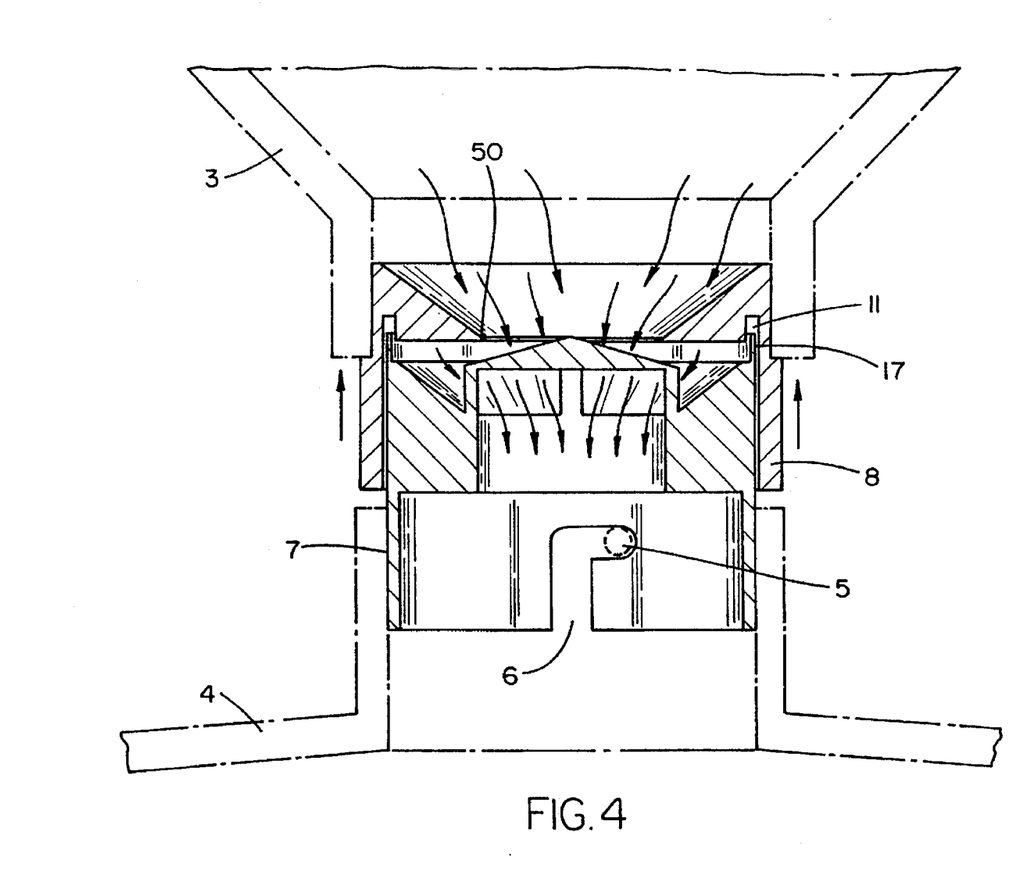
FIG. 4 shows a sectional view of the open valve device of FIG. 1 connected between the discharge opening of a container and the receiving opening of a hopper.
Figure 5:
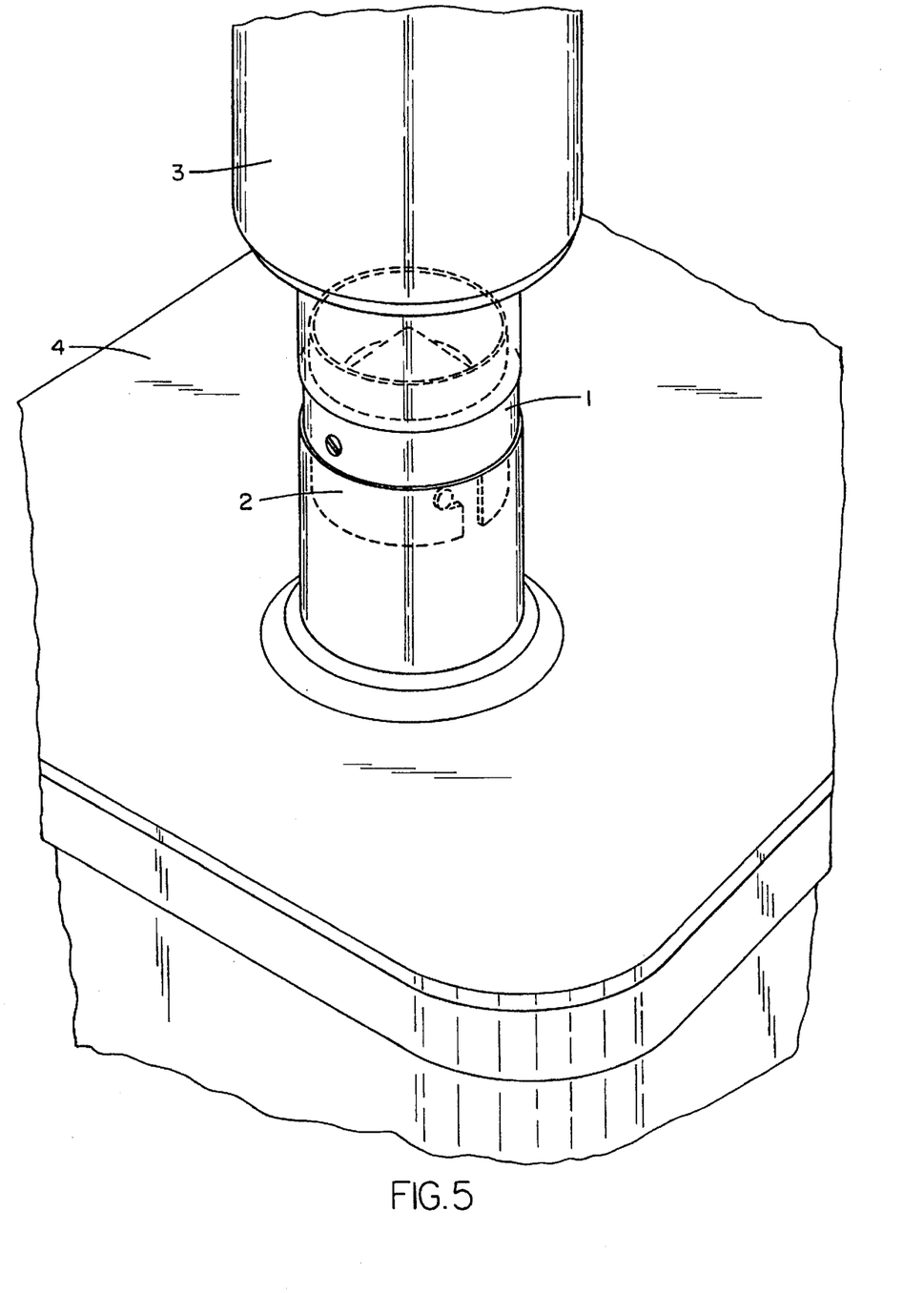
FIG. 5 is a perspective view of a container connected to a hopper by means of the valve device shown in FIG. 1.
Figure 6:
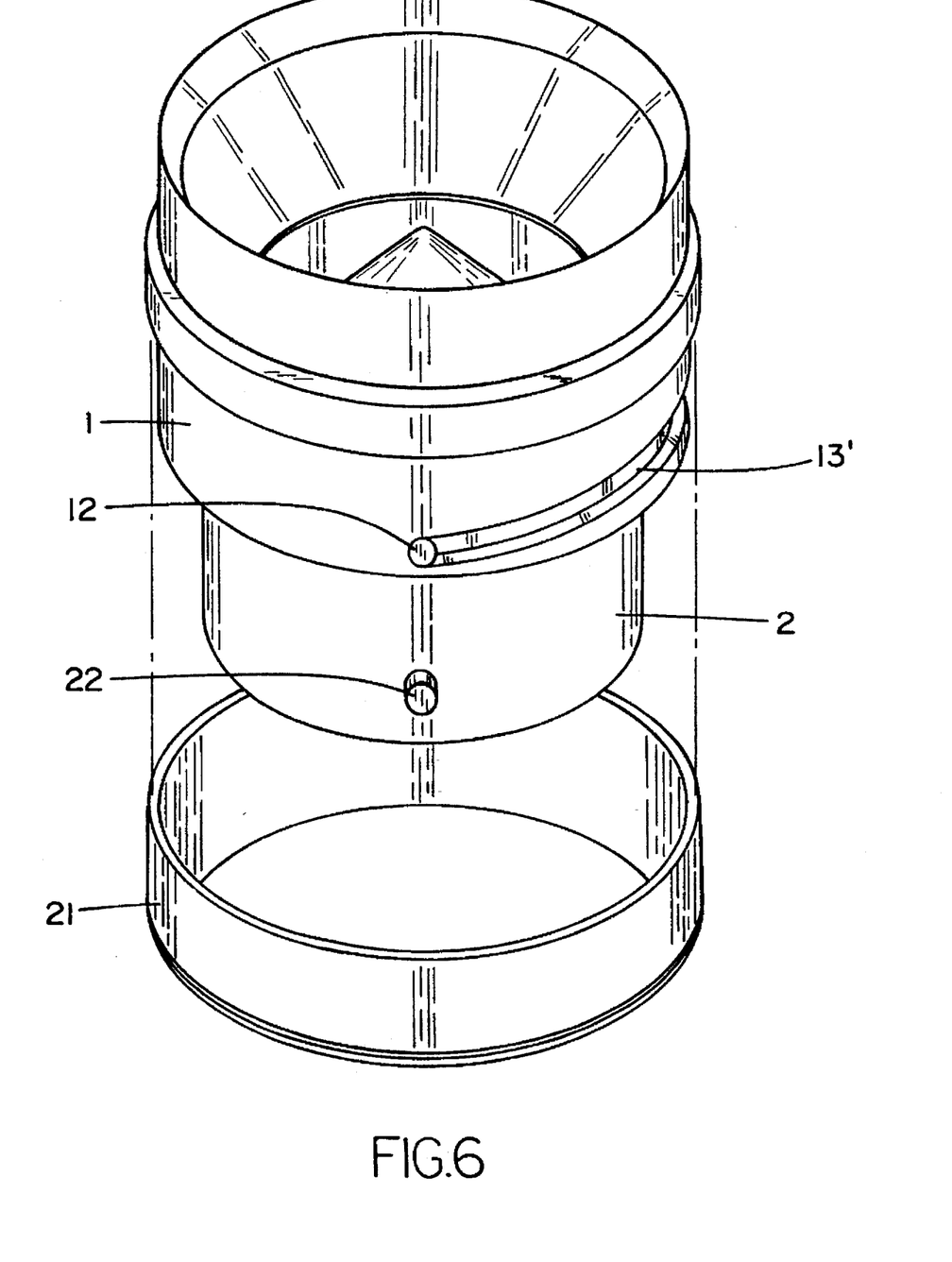
FIG. 6 shows a perspective view of another valve device according to the present invention when open.
Figure 7:
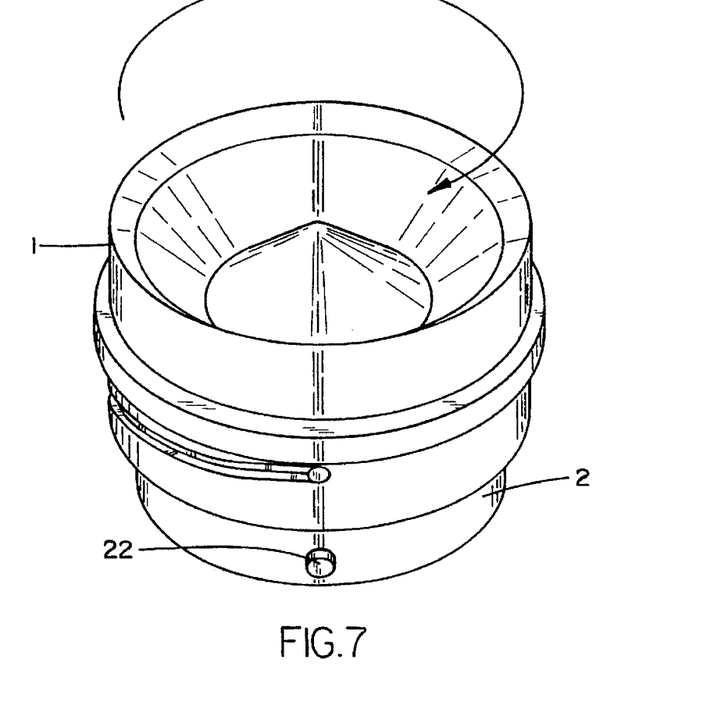
FIG. 7 shows a perspective view of the valve device of FIG. 6 when closed.
Figure 8:
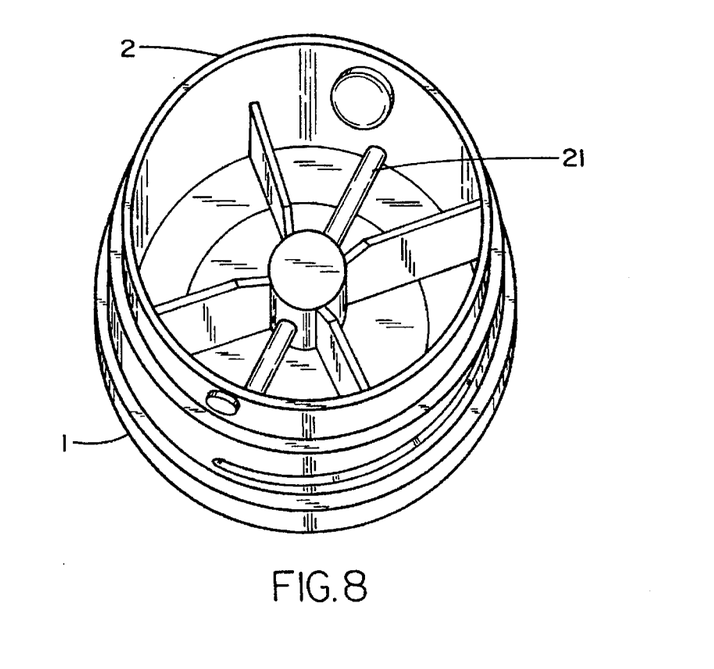
FIG. 8 shows a perspective view of the valve device of FIG. 6 view from underneath.

Referring to FIGS. 1 to 5 of the accompanying drawings the valve device comprises a housing 1 and a valve member 2. As shown in FIGS. 4 and 5 the housing 1 is adapted to be received in the discharge spout or opening of a container 3 filled with a flowable material and the housing 2 is adapted to be connected over the receiving opening of a hopper 4. As shown the housing 1 forms a push fit in the discharge opening of the container 3 and the valve member 2 is held in place within the filler opening of the hopper 4 by means of a bayonet fitting i.e. the filler opening of the hopper 4 has inwardly projecting prongs 5 which engage in L-shaped slots 6 in a side wall 7 of the valve member 2. However, alternative means for connecting the valve device between the container 3 and the hopper 4 can be envisaged.

Figure 1:
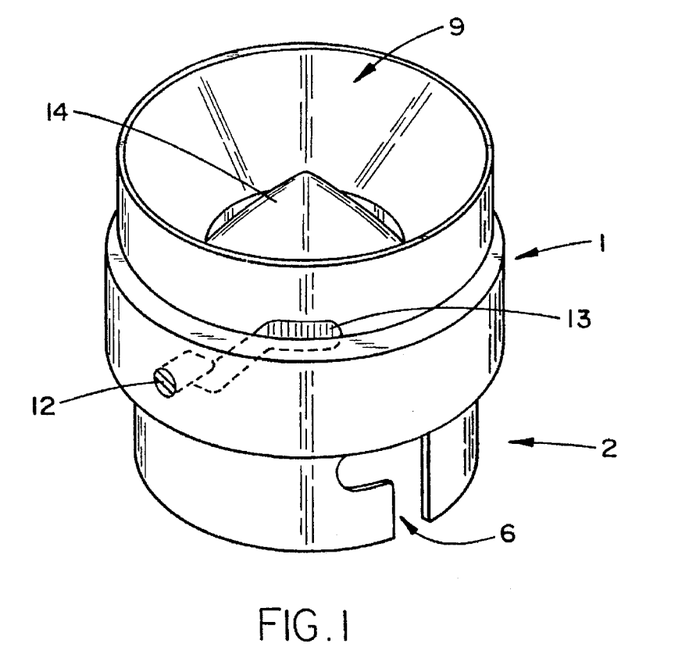
FIG. 1 shows a perspective view of a valve device according to the present invention when closed.
Figure 2:
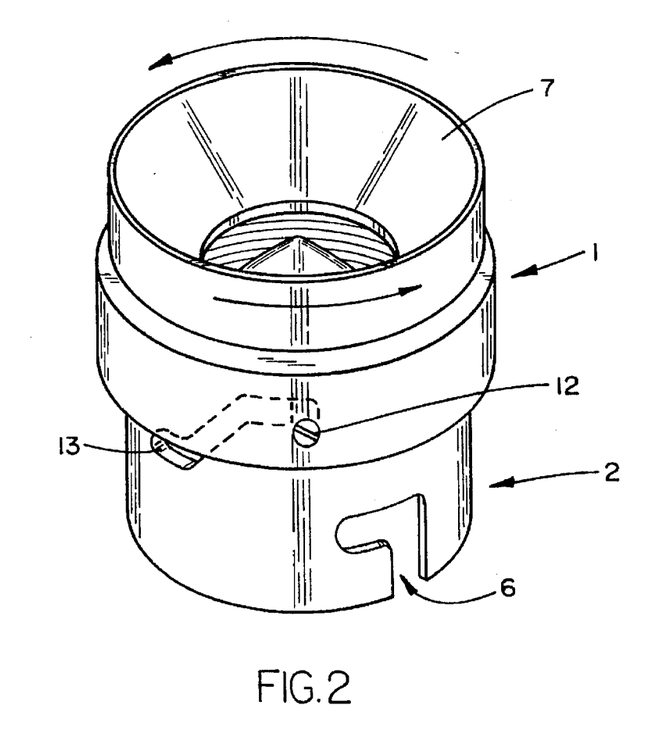
FIG. 2 shows a perspective view of the valve device of FIG. 1 when open.

The housing 1 takes the form of an inverted cup having an upstanding wall 8 and a funnel shaped passageway 9 in the base 10 thereof the inner end of which defines a valve seat 50. A circumferential groove 11 is provided in the inside surface of the base 10 of the cup immediately adjacent to the upstanding wall 8.

The valve member 2 is received inside the housing 1 and is retained in place by means of outwardly projecting lugs 12 carried by the housing 1 which engage in camming grooves (13,13') provided in the side wall 7 of the valve member 2. The valve member 2 comprises a conical valve disc 14 mounted on a tower 15. The tower 15 takes the form of a cross shaped member and defines four passageways (only two of which are visible in FIGS. 3 and 4) around the valve disc 14 through which material can flow into a cylindrical passageway 16 when the valve device is open, as illustrated by the arrows in FIG. 4. In this regard, the valve disc 14 co-operates with the valve seat 50 in the housing 1 to open and close the valve device. An upstanding circumferential flange 17 is provided around the inside, upper edge of the valve member 2 and this engages with the circumferential groove 11 in the housing 1 when the valve device is closed (see FIG. 3) and when it is open (see FIG. 4). In this way the upstanding flange 17 encloses the gap formed between the housing 1 and the valve member 2 when the valve device is open, and ensures that material flowing through the valve device does not escape into the gap between the upstanding wall 8 of the housing 1 and the sides of the valve member 2.

In use, the valve device is used to couple the container 3 to the hopper 4. Initially, of course; the valve device is closed. When it is required to empty the contents of the container 3 into the hopper 4 the housing 1 is rotated relative to valve member 2 so that the inwardly projecting lugs 12 track the camming grooves (13, 13') and drive the housing 1 away from the valve member 2. This, of course, opens the passage in the housing and allows material to flow from the container 3 into the hopper 4.

When uncoupling the container 3 from the hopper 4 this process is reversed. The housing 1 is rotated relative to the valve member 2 in the opposite direction to bring the housing 1 and the valve member 2 together and close the passage. The valve device and the container can then be disconnected from the hopper.

Referring now to FIGS. 6 to 9 of the accompanying drawings there is shown another valve device in accordance with the present invention. This valve device is identical to the valve device of FIGS. 1 to 5 in the way that it operates. There are, however, a number of subtle differences in design which deserve to be mentioned. In the first place the valve device comprises a collar 21 which snap fits into place over and around the cup-shaped housing 1 to cover the camming grooves (13, 13') provided therein. In addition, the radially outwardly extending lugs 12 carried by the valve member 2 to engage in the camming grooves (13, 13') are provided by a bar or rod 21, which can best be viewed in FIG. 8.

Furthermore, in the valve device of FIGS. 6 to 9 it is the valve device itself that is provided with bayonet pins 22 and the receiving opening 23 of the hopper 24 that is provided with bayonet slots 25 and not the opposite way around as with the valve device of FIGS. 1 to 5.

Figure 9:
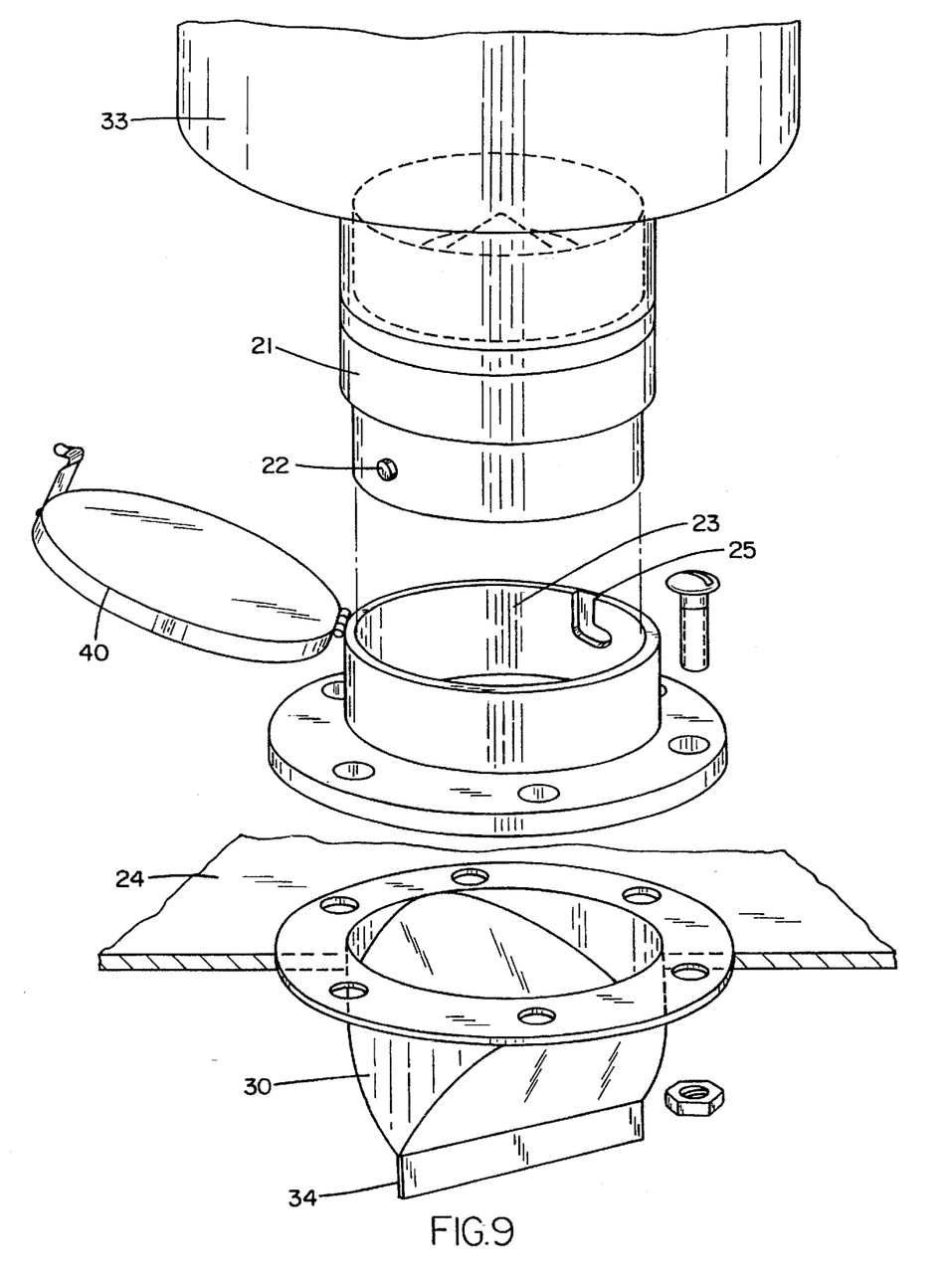
FIG. 9 is a partial view of a container connected to a hopper by means of the valve device shown in FIG. 6.

Finally, and referring specifically to FIG. 9 there is shown a self sealing diaphragm 30 which can be secured in place across the opening of the hopper 24 (only the lid of which is partially shown) to prevent material from escaping therethrough when the container 33 (also only partially shown) and the valve device is removed. The diaphragm is comprised of resilient material and has a slot-shaped opening 34 at its centre which is normally biased closed. When the valve device is opened to allow material to flow into the hopper 32, the slot-shaped opening 34 is forced open under the weight of material on it. However, as soon as the flow of material through the slot shaped opening 34 ceases it returns to its normally closed condition. This prevents material from billowing out of the receiving orifice even though the valve device has been removed. For further security against the escape of material from the hopper, and to prevent contaminants getting into the hopper, the receiving orifice can be closed with a cap 40.

In both of the embodiments of the present invention discussed above the valve device empties the contents of a container into a hopper forming part of an applicator device. However, it will be appreciated that the valve device may just as well be used to couple a container directly to the metering system of an applicator device, thereby dispensing with the need to provide the applicator device with a hopper.

Lastly, whilst the valve device of the present invention has been discussed with reference to agricultural treatment agents, it will be understood that it finds application in virtually any situation where it is required to couple a container filled with a flowable material to a device intended to receive the material.

I claim:

1. A value device for connecting a container filled with a flowable material to a receptacle, comprising a unitary, essentially cup-shaped housing having a base with an axially extending flow passage formed in the base and a valve seat formed around the inner end of the flow passage and radially inwardly of an axially extending wall of the housing; a unitary, essentially cylindrical valve member which is received in an open end of said cup-shaped housing, having an axially extending flow passage therein in axial alignment with the flow passage in the cup-shaped housing and a valve disc of said valve member which is positioned in a spaced relationship over the inner end of the flow passage in the cup-shaped housing; means for axially displacing the valve member relative to the housing upon rotational movement of the housing with respect to said container, so as to effect engagement of the valve disc with the valve seat to close the flow passage in the housing and disengagement to open the flow passage in the housing; and means for connecting the housing to the discharge orifice of the container and for connecting the valve member to the receiving orifice of the receptacle.

2. A value device according to claim 1, wherein the means for effecting axial displacement of the valve member relative to said housing comprises radially outwardly projecting lugs carried by the valve member which engage in camming grooves in the axially extending wall of the housing.

3. A valve device according to claim 1 or 2, wherein a circumferentially continuous groove is formed in the base of the housing around the passage and the valve seat defined therein, and an upstanding circumferentially flange extends around the inner end of the valve member, which upstanding flange is received in the continuous groove when the valve device is closed.

4. A valve device according to claim 1, wherein the means for effecting axial displacement of the valve member relative to said housing comprises radial lugs in the axially extending wall of the housing which engage in camming grooves formed in the valve member.

5. A valve device according to claim 1, wherein said receptacle comprises an applicator device for dispensing the flowable material.

6. A valve device according to claim 5, in operatively interconnected combination with said applicator device.

7. A valve device according to claim 5, in operatively interconnected combination with said applicator device, wherein a self sealing device is fitted in the receiving orifice of the applicator device.

8. A valve device in combination with the applicator device according to claim 7, wherein the self sealing device comprises means fitted across the receiving orifice of the applicator device and having an opening therein which is normally closed.

9. A valve device according to claim 8, wherein said fitted means comprises a resilient diaphragm.

10. A valve device according to claim 7, wherein said applicator device comprises a hopper.

* * * * *